United States Patent
Narang et al.

(10) Patent No.: US 7,995,716 B2
(45) Date of Patent: Aug. 9, 2011

(54) ASSOCIATION OF EMAIL MESSAGE WITH VOICE MESSAGE

(75) Inventors: Nidhi Narang, Fremont, CA (US); Radha Iyer, Cupertino, CA (US); Manisha Sahasrabudhe, Santa Clara, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1258 days.

(21) Appl. No.: 11/522,044

(22) Filed: Sep. 15, 2006

(65) Prior Publication Data

US 2008/0069312 A1     Mar. 20, 2008

(51) Int. Cl.
*H04M 11/00* (2006.01)

(52) U.S. Cl. .................................. 379/88.13; 379/88.25

(58) Field of Classification Search .... 379/88.13–88.14, 379/88.25; 455/413; 709/206–245; 705/14.53–14.61
See application file for complete search history.

(56) References Cited

U.S. PATENT DOCUMENTS

| | | | |
|---|---|---|---|
| 6,405,243 B1* | 6/2002 | Nielsen | 709/206 |
| 6,411,696 B1* | 6/2002 | Iverson et al. | 379/201.06 |
| 6,459,774 B1* | 10/2002 | Ball et al. | 379/67.1 |
| 6,600,814 B1* | 7/2003 | Carter et al. | 379/88.16 |
| 6,728,934 B1* | 4/2004 | Scopes | 715/205 |
| 7,216,227 B2* | 5/2007 | Grynberg | 713/162 |
| 7,379,421 B1* | 5/2008 | Gao et al. | 370/230.1 |
| 7,561,680 B1* | 7/2009 | Falcone et al. | 379/88.25 |
| 2007/0088687 A1* | 4/2007 | Bromm et al. | 707/4 |

* cited by examiner

*Primary Examiner* — Simon Sing
*Assistant Examiner* — Assad Mohammed

(57) ABSTRACT

Some embodiments provide reception of a call from a calling party to a called party, acquisition of a voice message form the calling party to the called party, reception from the calling party a selection of an email message sent to the called party, and association of the voice message with the email message.

20 Claims, 7 Drawing Sheets

ASSOCIATION OF EMAIL MESSAGE WITH VOICE MESSAGE

BACKGROUND

1. Field

Embodiments may generally relate to systems incorporating voice and email messaging. More particularly, some embodiments are concerned with associating a voice message with a previously-sent email message.

2. Description

Current technology allows people to contact one another using various communication modes. Telephone and email communication (both wired and wireless) are ubiquitous, while text messaging, instant messaging and fax communication are also preferred communication modes in some scenarios. Each communication mode provides an alternative point of contact, which can present problems for the receiving party (e.g., continuous checking of/interruption by communication devices) as well as the sending party (e.g., determining appropriate communication mode, determining contact information for the determined mode, leaving multiple messages via multiple communication modes). Generally, the existence of multiple commonly-used communication modes can result in communication inefficiency.

Unified messaging is a concept that provides some integration of various communication modes. For example, Siemens Openscape® system provides a "presence-aware" system that allows receiving parties to specify their availability with respect to various communication modes. Calling parties may view this availability and determine a communication mode for contacting a receiving party based thereon. Unified messaging systems such as Siemens HiPath Xpressions® may also allow retrieval of voice messages, email messages, facsimiles, text messages, etc. via a single interface (e.g., a Web browser).

Conventional unified messaging systems do not provide suitable integration of different communication modes from the sender's perspective. That is, although the receiver is able to use one communication mode to access communications sent via a different communication mode, a sender is limited to the features of only one communication mode at a given time.

Unified messaging systems, as well as conventional voice messaging systems, allow a user to retrieve voice messages that are stored in a voice message mailbox associated with the user. For example, a calling party may call a user's (i.e., a called party's) cellular telephone number and, if the user does not answer the call within a specified number of rings, the call may be transferred to and answered by a voice message mailbox provider. The calling party may then generate (e.g., orally dictate) a voice message that is stored by the voice message mailbox provider in a voice message mailbox associated with the user.

Systems are desired that may provide improved integration of voice messages with other communication modes.

SUMMARY

Some embodiments provide a system, method, telephone, program code and/or means to receive a call from a calling party to a called party, acquire a voice message from the calling party to the called party, receive from the calling party a selection of an email message sent to the called party, and associate the voice message with the email message.

In further aspects, associating the voice message with the email message includes creating a new email message to the called party, and attaching the voice message and the selected email message to the new email message. Still other aspects include determining an identity of the calling party, determining the plurality of email messages sent to the called party based on the determined identity, and presenting the plurality of email messages to the calling party.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
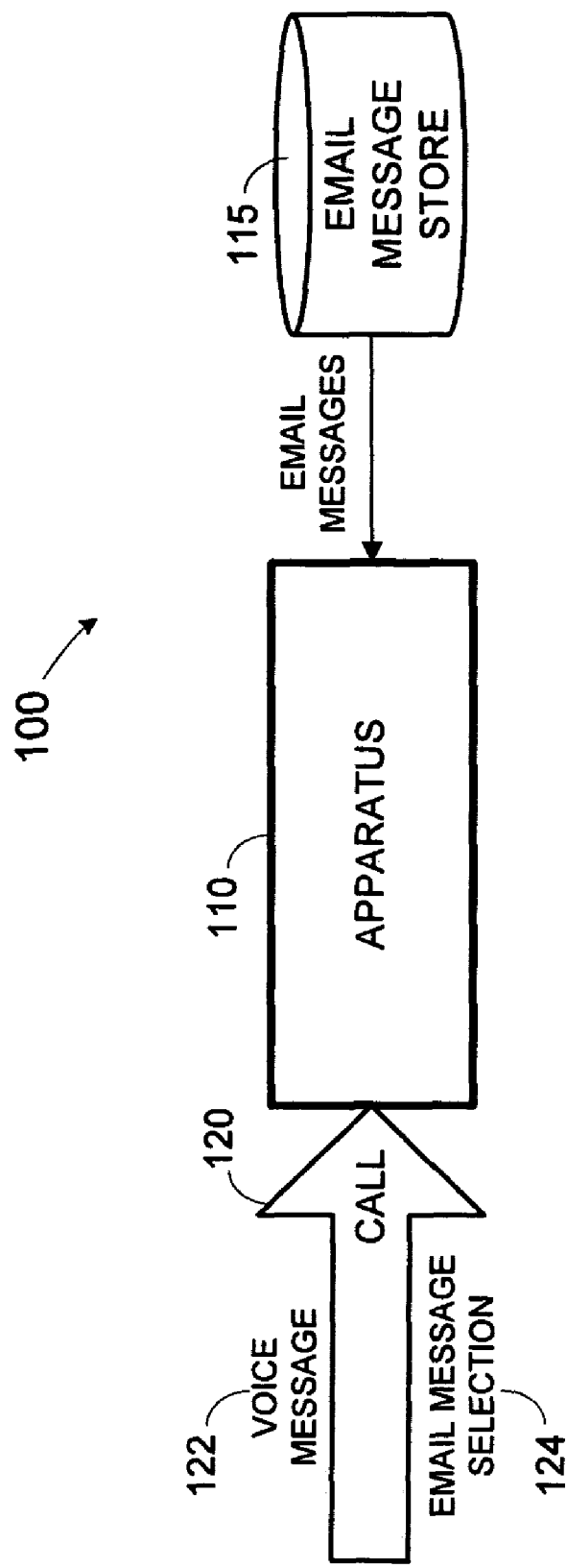
FIG. 1 is a block diagram of a system according to some embodiments.

FIG. 1 is a block diagram of system 100 according to some embodiments. System 100 may comprise elements within a unified messaging system according to some embodiments. System 100 includes apparatus 110 and email message store 115. Apparatus 110 and email message store 115 may be embodied by any suitable combinations of hardware, software and/or firmware, and may share some elements therebetween. Apparatus 110 and email message store 115 may be located adjacent to or remote from one another, and may be elements of a single apparatus (e.g., a messaging server). Apparatus 110 and email message store 115 may communicate over any suitable one or more protocols and/or physical communication links.

According to some embodiments, apparatus 110 receives call 120 from a calling party (not shown) to a called party. Apparatus 110 then acquires voice message 122 from the calling party to the called party. Next, apparatus 110 receives email message selection 124 from the calling party and associates the acquired voice message with the selected email message. Details of each of the above steps according to some embodiments will be provided below. Some embodiments of the foregoing may provide improved integration of voice and email messaging.

Figure 2:
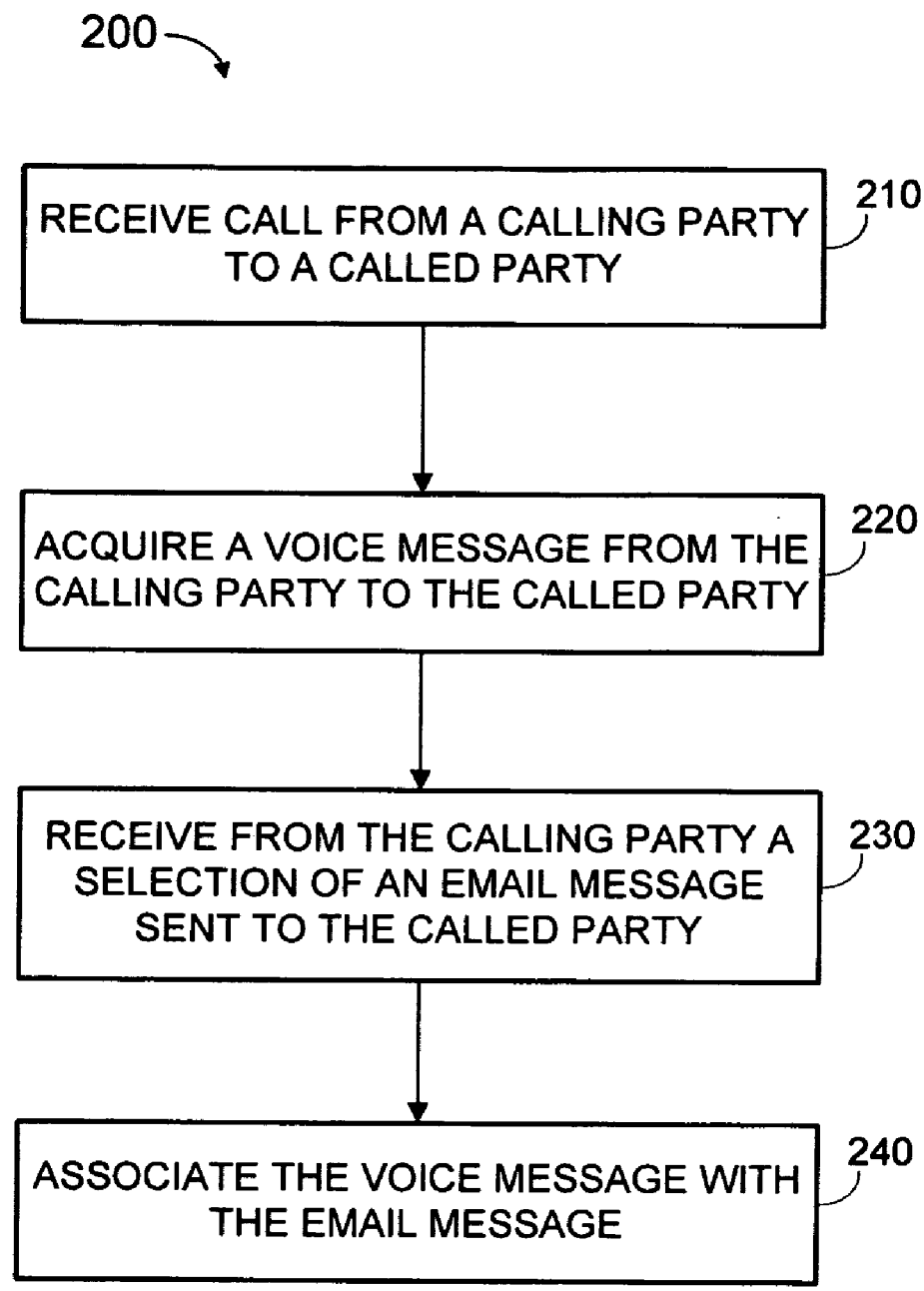
FIG. 2 is a flow diagram of a process according to some embodiments.

FIG. 2 is a flow diagram of process 200 according to some embodiments. Process 200, as well as the other processes described herein, may be executed by system 100 using any suitable hardware and/or software arrangement, and may be executed by any suitable device or devices that are or become known.

A call from a calling party to a called party is initially received at step 210. According to some embodiments, the call may be received via the Public-Switched Telephone Network (PSTN), a Voice over Internet Protocol (VOIP) network, or a Global System for Mobile communication (GSM) network and/or may have been passed through one or more of these networks prior to receipt. In some embodiments, the call is received by a voice server associated with the called party. The voice server may be a designated termination point for calls transmitted to a telephone number of the called party.

According to some embodiments of step 210, apparatus 110 executes a voice mail application to receive the call. In particular, apparatus 110 determines that the call has not been answered by the called party and, in response, executes the voice mail application to perform any signaling required to establish a two-way audio circuit with the calling party in view of the appropriate call setup protocol.

A voice message from the calling party to the called party is acquired at 220. The voice message may be acquired using any suitable system that is or becomes known. Continuing with the foregoing example, execution of the voice mail application may cause apparatus 110 to transmit an audible message (e.g., "Leave a Message at the Tone", followed by a tone) to the calling party via the established circuit at step 220. Apparatus 110 then records any audio signals received from the calling party via the audio circuit. Recording may terminate if the calling party terminates the call and/or if a preconfigured recording time limit is reached.

Next, at step 230, a selection of an email message sent to the called party is received from the calling party. The selection may be received over the established call. In some embodiments of step 230, apparatus 110 accesses email message store 115 and retrieves several of the email message stored therein. The retrieved email message may comprise email messages that were previously sent from the calling party to the called party.

The retrieved email messages may then be presented to the calling party. The presentation may consist of converting the Subject field of each email message to speech signals and transmitting the speech signals to the calling party. The received selection may comprise a speech signal (e.g., "Yes") or a Dual Tone Multi-Frequency signal (e.g., resulting from depressing a telephone key) received from the calling party.

The voice message acquired at step 220 is associated with the selected email message at step 240. The association may comprise establishing a logical link between the email message and the voice mail message in a relational database or otherwise establishing a relationship between a representation of the voice message and a representation of the email message. In some embodiments, step 240 comprises creating a new email message and attaching the voice message and the selected email message thereto.

Figure 3:
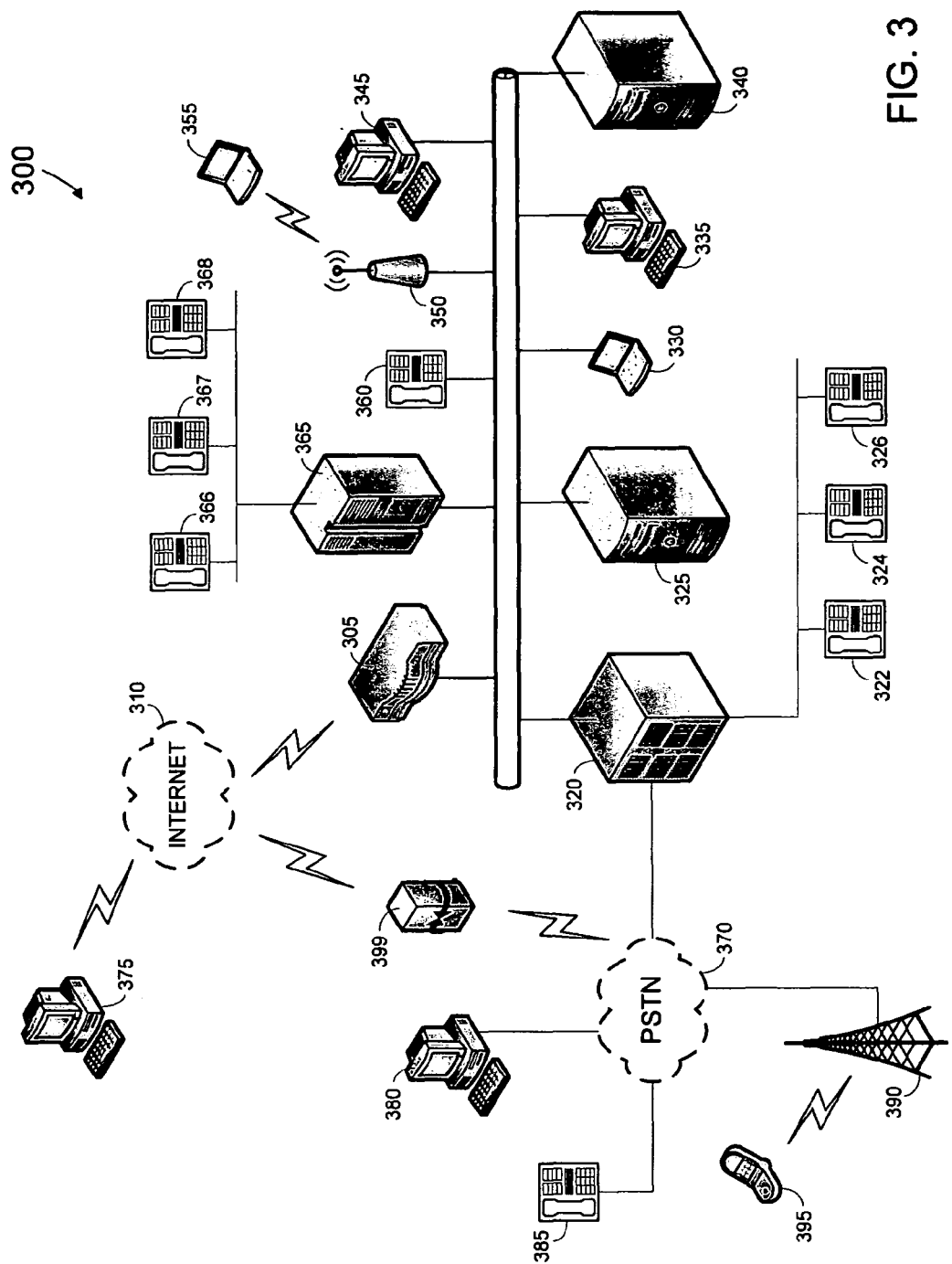
FIG. 3 is a diagram of a system architecture according to some embodiments.

The above-mentioned signals, calls, voice messages and email messages may pass through any number of networks, devices and protocols before reaching their intended recipient. FIG. 3 is a diagram of system architecture 300 according to some embodiments. Embodiments are not limited to the illustrated devices or architecture.

Router 305 couples Internet 310 to Ethernet network 315. Router 305 may thereby transmit IP packets between Internet 310 and devices coupled to network 315. These IP packets may include IP packets of a voice call. Router 305 may provide other well-known functions, such as Network Address Translation and firewall functions.

Also connected to network 315 are Private Branch exchange (PBX) 320, email server 325, laptop computer 330, desktop computer 335, data server 340, desktop computer 345, wireless access point 350, laptop computer 355, IP telephone 360, and voice server 365. PBX 320 may be coupled to PSTN 370 to receive and place conventional telephone calls in conjunction with conventional telephones 322 through 326. Email server 325, laptop computer 330, desktop computer 335, data server 340, desktop computer 345, wireless access point 350, laptop computer 355 and IP telephone 360 may comprise well-known arrangements providing well-known functions.

Voice server 365 may receive and transmit VoIP calls from and to Internet 310 via router 305. According to some embodiments, voice server 365 operates as described above with respect to process 200. In this regards, voice server 365 may receive calls intended for users of IP telephones 366 through 368.

The aforementioned calls may be received from calling parties via Internet 310 and/or PSTN 370. For example, a calling party may place a VoIP call from desktop computer 375 to a telephone number associated with voice server 365. Desktop computer 380 or conventional analog telephone 385 may be used by a calling party to initiate a PSTN call to a telephone number associated with PBX 320. Similarly, tower 390 may receive a call from cellular telephone 395 and may forward the call to PSTN 370 according to governing protocols. Finally, gateway 399 may forward calls placed by devices 380, 385 and 395 to Internet 310 and on to voice server 365, and may also forward calls placed by desktop computer 375 to PSTN 370 and on to PBX 320.

Architecture 300 may include any number of devices and systems for transferring data, including but not limited to local area networks, wide area networks, telephone networks, cellular networks, fiber-optic networks, satellite networks, infra-red networks, radio frequency networks, and any other type of networks which may be used to transmit information between devices. Additionally, data may be transmitted through architecture 300 using one or more currently- or hereafter-known network protocols, including but not limited to Asynchronous Transfer Mode (ATM), Internet Protocol (IP), Hypertext Transfer Protocol (HTTP) and Wireless Application Protocol (WAP).

The elements of architecture 300 may be connected differently than as shown. For example, some or all of the elements may be connected directly to one another. Embodiments may include elements that are different from those shown. Moreover, although the illustrated communication links between the elements of architecture 300 appear dedicated, each of the links may be shared by other elements. Elements shown and described as coupled or in communication with each other need not be constantly exchanging data. Rather, communication may be established when necessary and severed at other times or always available but rarely used to transmit data.

Device 1 may comprise a portable device or a fixed device, the latter including but not limited to a "land line" telephone. Examples of portable devices include cellular telephones, personal digital assistants (PDAs), digital media players, digital cameras, wireless email devices, and any other device for communicating with a voice message mailbox provider that is or becomes known.

Figure 4:
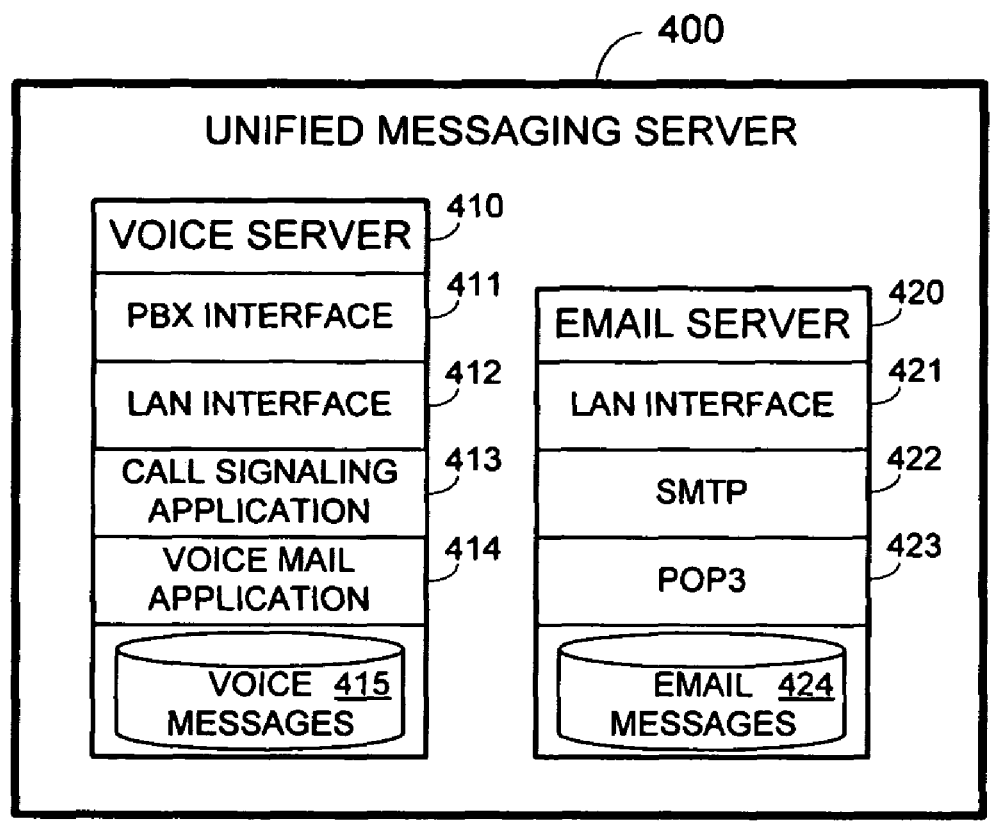
FIG. 4 is a block diagram of the internal architecture of a messaging server according to some embodiments.

FIG. 4 is a block diagram of unified messaging server 400 according to some embodiments. Server 400 may embody the functionality of email server 325 and voice server 365 of architecture 300. Server 400 may operate in accordance with process 200 in some embodiments.

Voice server 410 and email server 420 of server 400 may comprise any suitable combination of hardware and/or software. Although illustrated as separate entities, voice server 410 and email server 420 may include common elements.

Voice server 410 comprises PBX interface 411, Local Area Network interface 412, call signaling application 413, voice mail application 414, and voice messages 415. PBX interface 411 allows voice server 410 to manage calls received from the PSTN and to directly place calls to the PSTN. As shown in FIG. 3, PBX interface 411 may also allow voice server 410 to communicate cooperatively with a separate PBX to provide desired functionality.

LAN interface 412 allows voice server 410 to receive IP packets from and transmit IP packets to a LAN. As described above, such IP packets may comprise VoIP packets. The IP packets may also comprise commands and data such as email messages. Voice server 410 executes call signaling application 413 to establish, maintain and terminate voice calls according to a suitable protocol. Such signaling, for both PSTN and VoIP calls, is known in the art.

Voice mail application 414 may comprise program code to provide the operation described with respect to process 200. Specifically, voice mail application 414 may include code to receive a call from a calling party to a called party, acquire a voice message from the calling party to the called party, receive from the calling party a selection of an email message sent to the called party, and associate the voice message with the email message. In this regard, elements 411 through 414 of voice server 410 may comprise processor-executable program code stored on a computer-readable medium.

Voice messages 415 may include voice messages acquired by voice mail application 414. Voice messages 415 may also be stored on a computer-readable medium in any format compatible with voice mail application 414. As is conventionally known, voice mail application 414 may allow a user to access her voice messages 415 by dialing a telephone number associated with voice server 410 and entering an appropriate access code.

Email server 420 includes LAN interface 421 for communicating with a LAN to which server 420 is coupled, Simple Mail Transfer Protocol module 422 for transmitting email messages via an IP network, Post Office Protocol ver. 3 module 423 for receiving email messages from an IP network, and stored email messages 424. Email server 420 may serve many users, and email messages 424 may include email messages sent to, sent from, and/or deleted by each of such users.

Voice mail application 414 may access email messages 424 according to some embodiments. Moreover, voicemail application 414 may generate a new email message, attach a voice message of voice messages 415 and an email message of email messages 424 to the new email message, and access SMTP module 422 to transmit the email message to a called party.

Figure 5A:
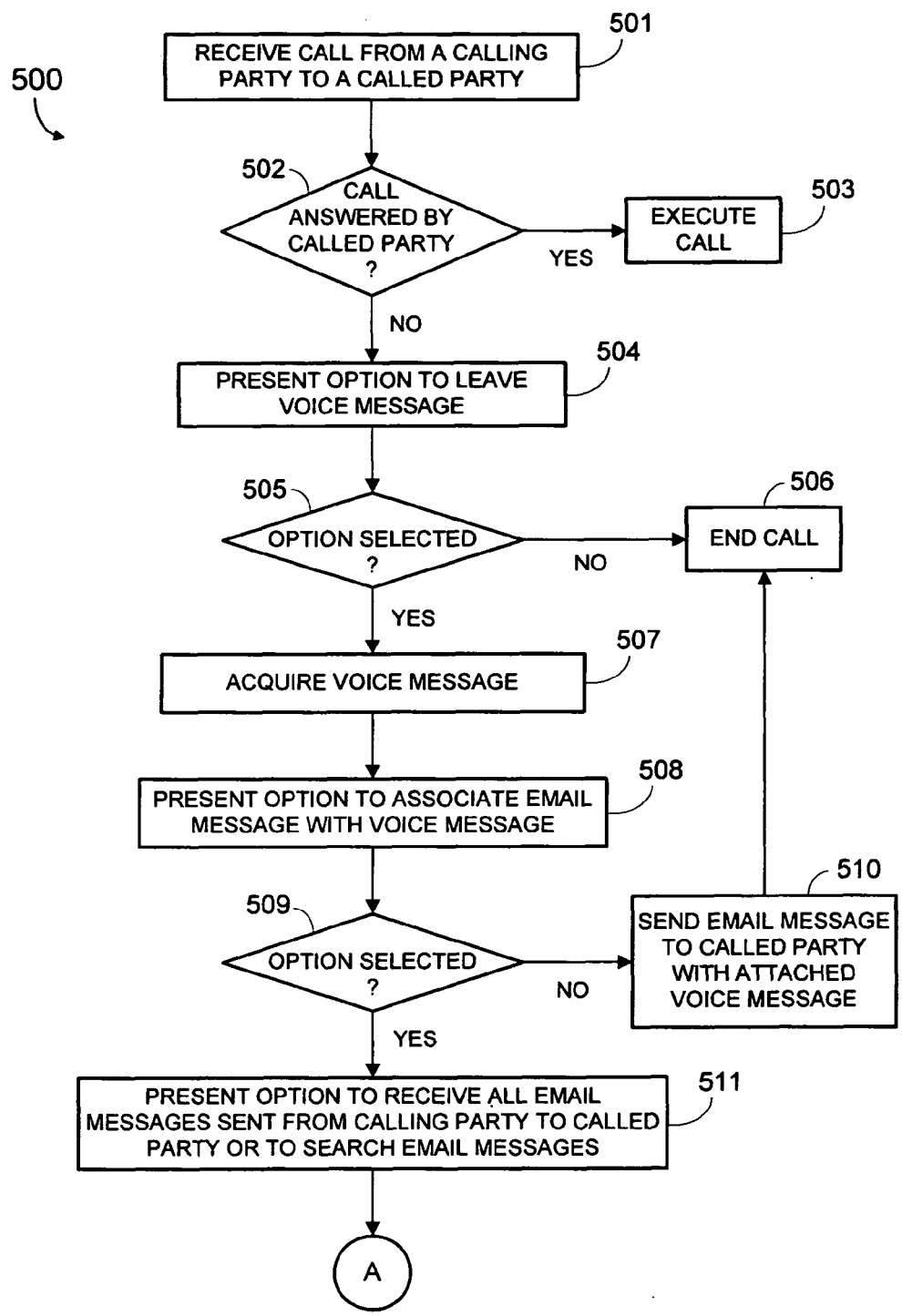
FIGS. 5A and 5B comprise a flow diagram of a process according to some embodiments.
Figure 5B:
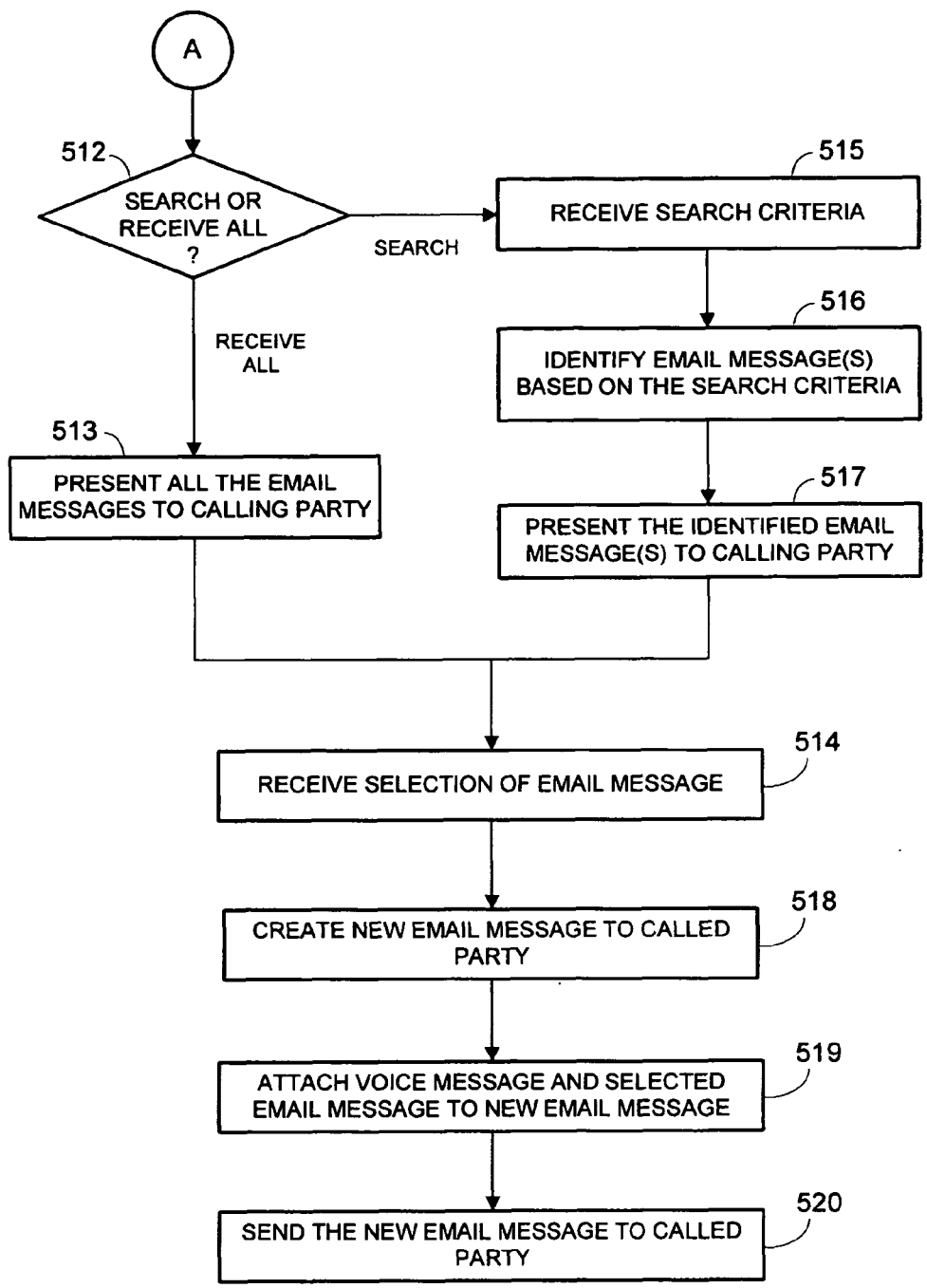

FIGS. 5A and 5B comprise a flow diagram of process 500 according to some embodiments. In some embodiments, process 500 is embodied in program code of voice mail application 414 and executed by server 400. More than one device may be used to execute process 500 according to some embodiments.

At step 501, a call is received from a calling party to a called party. The call may be received via any media that is currently- or hereafter-known, including but not limited to the PSTN, a VOIP network, or a GSM network. The call may received by a voice server such as server 410 that is a designated termination point for calls transmitted to a telephone number of the called party.

If it is determined at step 502 that the call was answered by the called party, flow proceeds to step 503 to execute the call. Execution of the call may comprise transmitting voice signals between the called party and the calling party until the call is terminated according to known protocols. Flow continues to step 504 if it is determined at step 502 that the call was not answered by the called party.

An option to leave a voice message is presented to the calling party at step 504. According to some embodiments, voice server 410 determines that the call has not been answered by the called party and, in response, executes voice mail application 414. Execution of voice mail application 414 provides a two-way audio circuit with the calling party and presentation of an option to leave a voice message. The presentation may comprise a recording such as, but not limited to, "Leave a message at the tone." followed by an audible tone. In some embodiments, the option to leave a voice message is presented by a recording such as "Press 1 to leave a message, Press 2 for more options".

If the option to leave a voice message is not selected at step 505 (e.g., calling party hangs up before leaving a voice message or selects an alternative option), the call is terminated at step 506. Voice mail application 414 may execute termination of the call at step 506 in conjunction with call signaling application 413 according to some embodiments.

If the option to leave a voice message is selected, a voice message from the calling party to the called party is acquired at step 507. The voice message may be acquired using any suitable system that is or becomes known, including recording any audio signals received from the calling party. The audio signals may be stored as a voice message among voice messages 416 of voice server 410.

Next, at step 508, an option to associate an email message with the acquired voice message is presented to the calling party. According to some embodiments, the option is presented by transmitting audio signals of a voice record such as "Press 1 to attach an email, Press 2 to quit". Any other system to present the option to the calling party may be implemented.

At step 509, it is determined whether the option was selected. If not (e.g., if the calling party has pressed 2), an email message is sent to the called party at 510, with the acquired voice message being attached as an audio file to the email message. Conventional techniques for creating and sending the email message may be employed in some embodiments. Such techniques may employ email server 420. According to some embodiments, the call is simply terminated if it is determined at step 509 that the option to attach an email message was not selected. In either case, the acquired voice message may be accessible from voice messages 415 using conventional methods to retrieve voice messages.

Still other options are presented at step 511 if the determination step 509 is affirmative. The presented options comprise an option to receive a presentation of all email messages sent from the calling party to the called party, and an option to search email messages sent from the calling party to the called party and select an email message therefrom. According to some embodiments, the recording "Press 1 to receive a presentation of all email messages sent by you to the called party, Press 2 to search all email messages sent by you to the called party" is played to the calling party at step 511.

Some embodiments comprise presenting additional or alternative options at step 511. Other options may allow the calling party to select email messages sent by the calling party to other parties, and/or to select email messages sent to the called party from a third party. Moreover, the options may be presented to the calling party in any suitable manner that is or becomes known.

At step 512, it is determined whether the calling party has selected the option to receive all email messages or to search the email messages. If the party has selected the option to receive all email messages, all the email messages are presented to the calling party at step 513. Presentation of the email messages may comprise transmitting audio associated with the email messages to the calling party. The audio may comprise any audio that may be used to identify an email message. For example, the audio may comprise a text-tospeech conversion of a message subject, a date and time at which a message was sent, a text-to-speech conversion of a message body, and/or any other suitable audio.

According to some embodiments, audio associated with each email message is transmitted sequentially at step 513. The audio may be interrupted by the calling party in order to select a given email message or to skip to audio associated with a next email message. A selection of an email message is received from the calling party at step 514. The received selection may comprise a speech signal, a Dual Tone Multi-Frequency signal, or any other suitable signal.

Flow proceeds from step 512 to step 515 if the calling party has selected the option to search all email messages. Voice server 410 may receive search criteria from the calling party at step 515. Step 515 may comprise prompting the calling party in any suitable manner for the search criteria. In some embodiments, the calling party uses a telephone keypad to transmit a start date and, optionally, an end date at step 515. The search criteria may comprise text and a specification of search fields (e.g., subject, body, etc.) according to some embodiments.

Email messages are then identified at step 516 based on the search criteria. With reference to one of the above examples, step 516 may comprise identifying email messages sent after the received start date. According to some embodiments of step 516, a query is sent from voice server 410 to email server 420 to identify and receive email messages of email messages 424 that satisfy the search criteria.

The identified email messages are presented to the calling party at step 517. As described above, the presentation may comprise transmitting audio associated with the identified email messages to the calling party. The audio may comprise any audio associated with the email messages and may be presented in any suitable manner including but not limited to those examples described with respect to step 513. A selection of one of the thusly-presented email messages is then received as described above at step 514.

A new email message to the called party is created at step 518. The new email message may be created using email server 420 and a known email address of the called party. The "From:" field of the new email message may be populated with an email address of the calling party, an email address associated with voice mail application 414, and/or an email address associated with email server 420.

Next, at step 519, email server 420 attaches the previously-acquired voice message and the selected email message to the new email message. As described above, the voice message may reside as an audio file within voice messages 415 and the selected email message may reside as a .pst file within email messages 424. The audio file and the .pst file may therefore be retrieved and attached to the new email message using conventional techniques.

Figure 6:
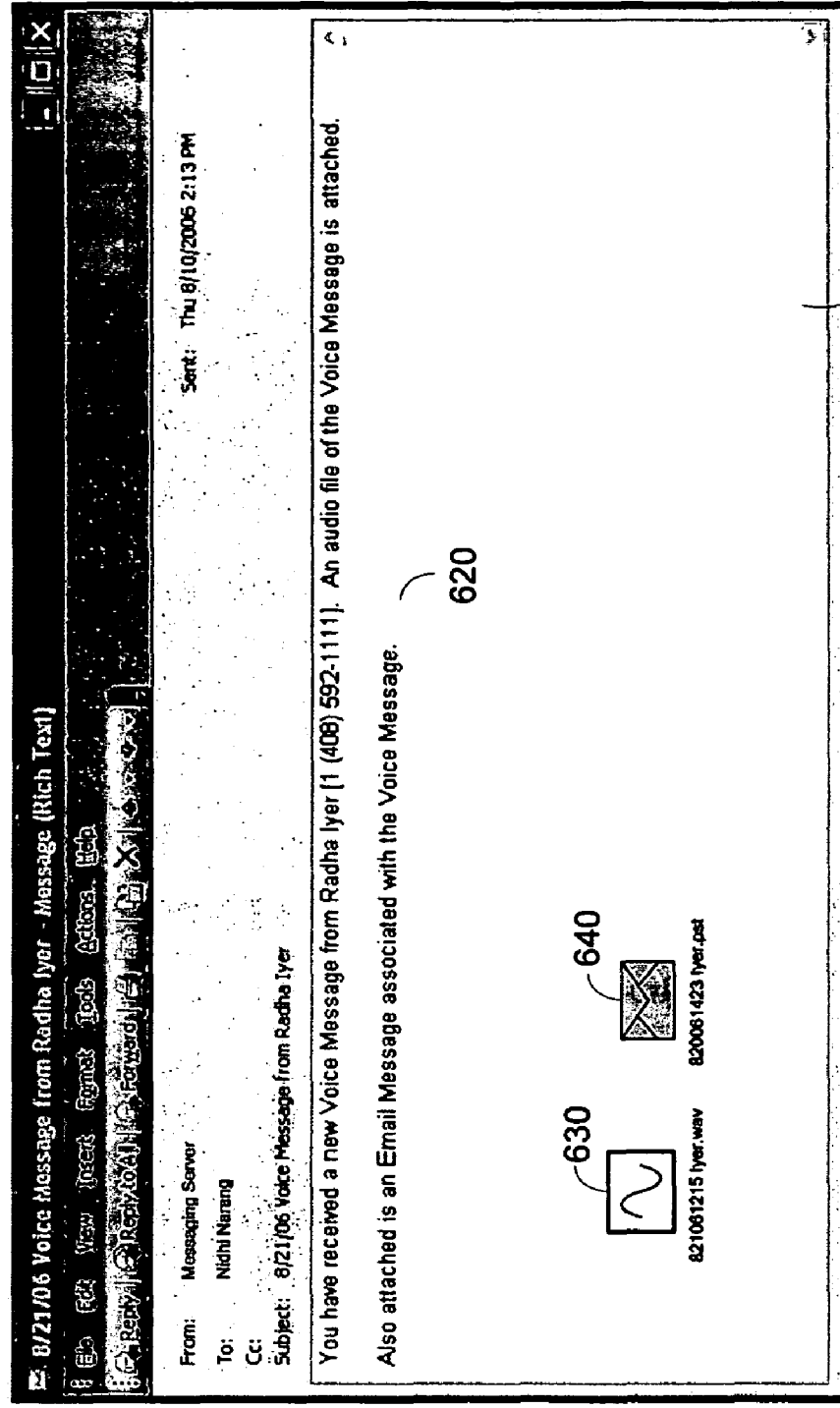
FIG. 6 is an outward view of an interface presenting an email message according to some embodiments.

FIG. 6 comprises an outward view of window 600 displaying new email message 610 after step 519. Message 610 includes explanatory text 620 as well as voice message audio file 630 and email message file 640. Accordingly, at step 520, email message 610 may be sent to the called party.

In some embodiments, the called party may use a telephone to access the voice message and the associated email message. For example, the called party dials an access number or extension of voice server 410 and, in response, voice server 410 queries the called party for an ID and/or password. Upon verifying the called party's identity, voice server 410 presents the called party with a menu for accessing conventional voice mailbox functions. One such function causes voice mail server 410 to audibly present the voice message to the called party.

According to some embodiments, voice mail server 410 also provides an indication of the associated email message and an option to receive the email message. If the called party selects the option, voice mail server 410 may convert one or more text fields of the email message (e.g., From, Subject, Date, Body) to speech signals and present the speech signals to the called party.

Embodiments described above are not intended to be limited to the specific form set forth herein, but are intended to cover such alternatives, modifications and equivalents as can reasonably be included within the spirit and scope of the appended claims.

What is claimed is:

1. A method, comprising:
receiving a call from a calling party to a called party;
acquiring a voice message from the calling party to the called party;
selectively retrieving a plurality of stored email messages sent to said called party; and
in response to the retrieving of the stored email messages:
receiving from the calling party a selection of an email message from said retrieved stored email messages; and
associating the voice message with the selected email message.

2. The method according to claim 1, wherein the retrieved stored email messages are email messages that were previously sent to the called party, the method further comprising:
presenting to the calling party the retrieved said stored email messages previously sent to the called party.

3. The method according to claim 2, wherein at least one of the plurality of retrieved stored email messages was sent to the called party from a third party.

4. The method according to claim 2, further comprising:
determining an identity of the calling party; and
retrieving the plurality of stored email messages based on the determined identity.

5. The method according to claim 2, wherein presenting the plurality of retrieved email messages comprises:
converting text associated with each of the plurality of retrieved email messages to speech signals; and
transmitting the speech signals to the calling party.

6. The method according to claim 2, further comprising:
receiving search criteria from the calling party; and
wherein the retrieving of the plurality of stored email messages is based on the search criteria.

7. The method according to claim 1, wherein associating the voice message with the email message comprises:
creating a new email message to the called party; and
attaching the voice message and the selected email message to the new email message.

8. The method according to claim 7, further comprising:
transmitting the new email message to the called party.

9. The method according to claim 1, further comprising:
presenting the voice message to the called party;
converting text associated with the selected email message to speech signals; and
transmitting the speech signals to the called party.

10. A The method according to claim 1, wherein if the calling party selects not to retrieve stored email messages the method comprises:
creating a new email message to the called party; and
attaching the voice message to the new email message.

11. The method according to claim 10, further comprising:
sending the new email message to the called party.

12. A communications system comprising an apparatus having a non-transitory medium storing program code, the program code comprising:
- code to receive a call from a calling party to a called party;
- code to acquire a voice message from the calling party to the called party;
- code to selectively retrieve stored email messages sent to said called party;
- code to receive from the calling party a selection of an email message from said retrieved stored email messages; and
- code to associate the voice message with the selected email message.

13. The communications system according to claim 12 wherein the program code further comprising:
- code to present to the calling party a plurality of retrieved said email messages sent to the called party.

14. The communications system according to claim 13, wherein at least one of the plurality of retrieved email messages was sent to the called party from a third party.

15. The communications system according to claim 13, wherein the program code further comprising:
- code to determine an identity of the calling party; and
- code to retrieve the plurality of email messages based on the determined identity.

16. The communications system according to claim 13, wherein the program code to present the plurality of retrieved email messages comprises:
- code to convert text associated with each of the plurality of retrieved email messages to speech signals; and
- code to transmit the speech signals to the calling party.

17. The communications system according to claim 13, wherein the program code further comprising:
- code to receive search criteria from the calling party; and
- code to retrieve the plurality of email messages based on the search criteria.

18. The communications system according to claim 12, wherein the program code to associate the voice message with the email message comprises:
- code to create a new email message to the called party; and
- code to attach the voice message and the selected email message to the new email message.

19. The communications system according to claim 18, wherein the program code further comprising:
- code to transmit the new email message to the called party.

20. The communications system according to claim 12, wherein the program code further comprising:
- code to present the voice message to the called party;
- code to convert text associated with the selected email message to speech signals; and
- code to transmit the speech signals to the called party.

\* \* \* \* \*